M. SKRMETTI.
FISHING APPARATUS.
APPLICATION FILED JAN. 29, 1920.
1,366,749.
Patented Jan. 25, 1921.
4 SHEETS—SHEET 3.
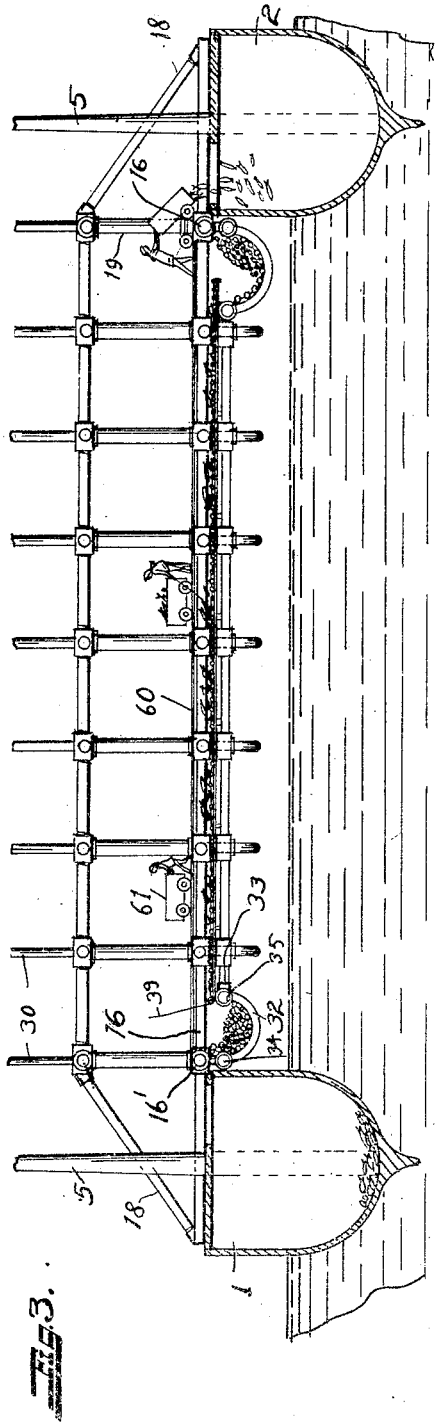
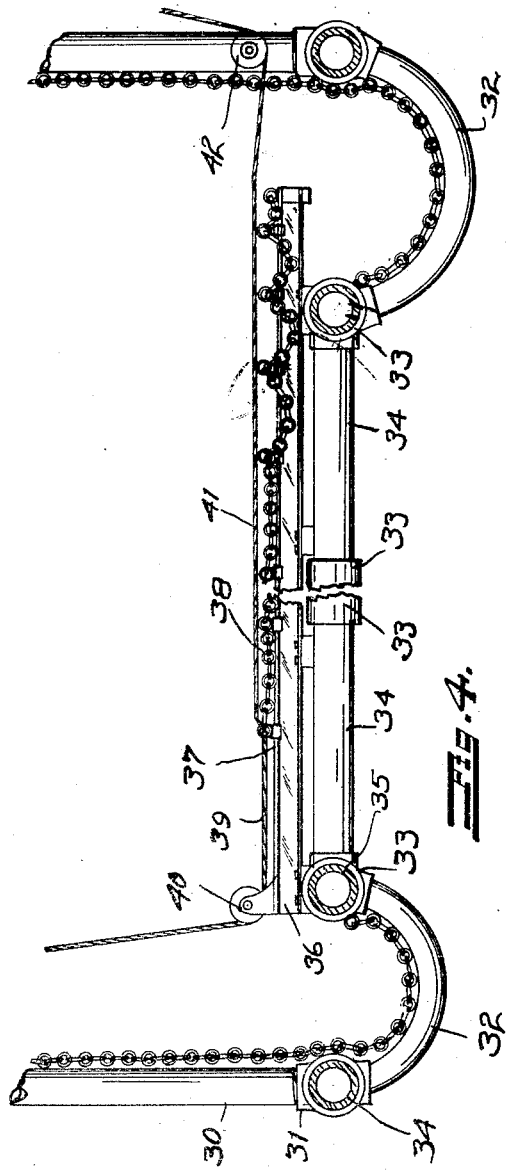
INVENTOR.
Millie Skrmetti.
BY
Carlos P. Griffin
ATTORNEY.

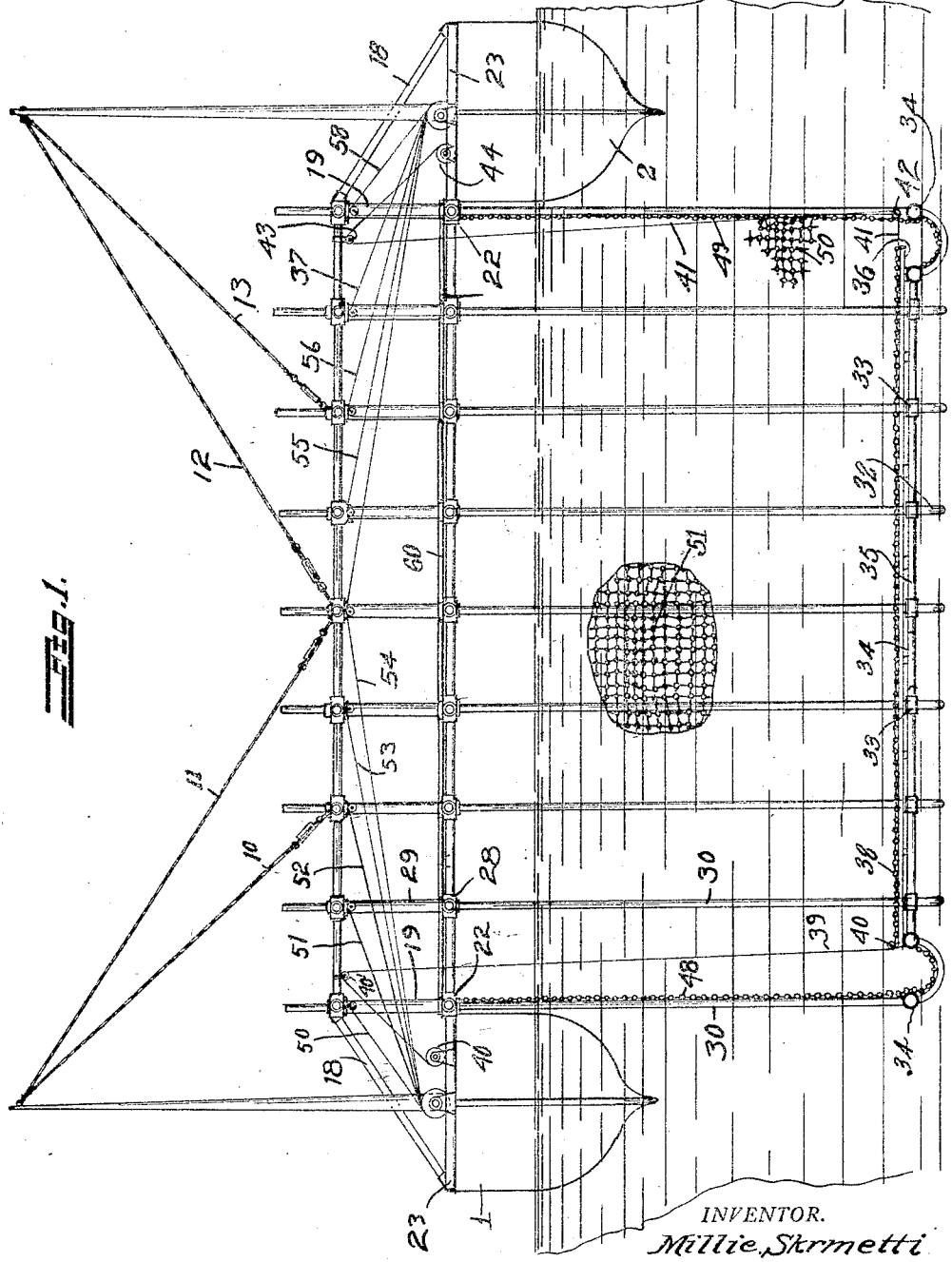

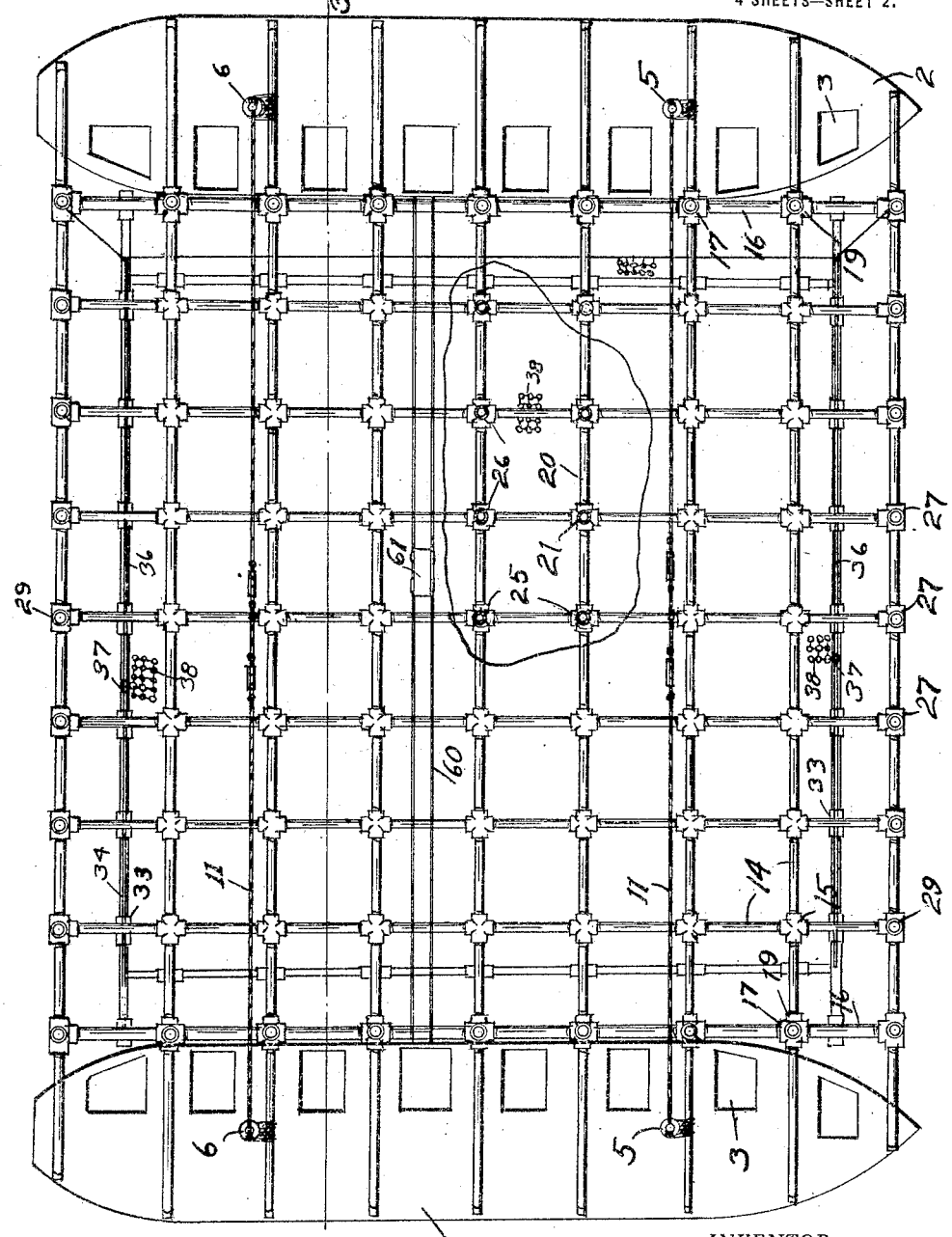

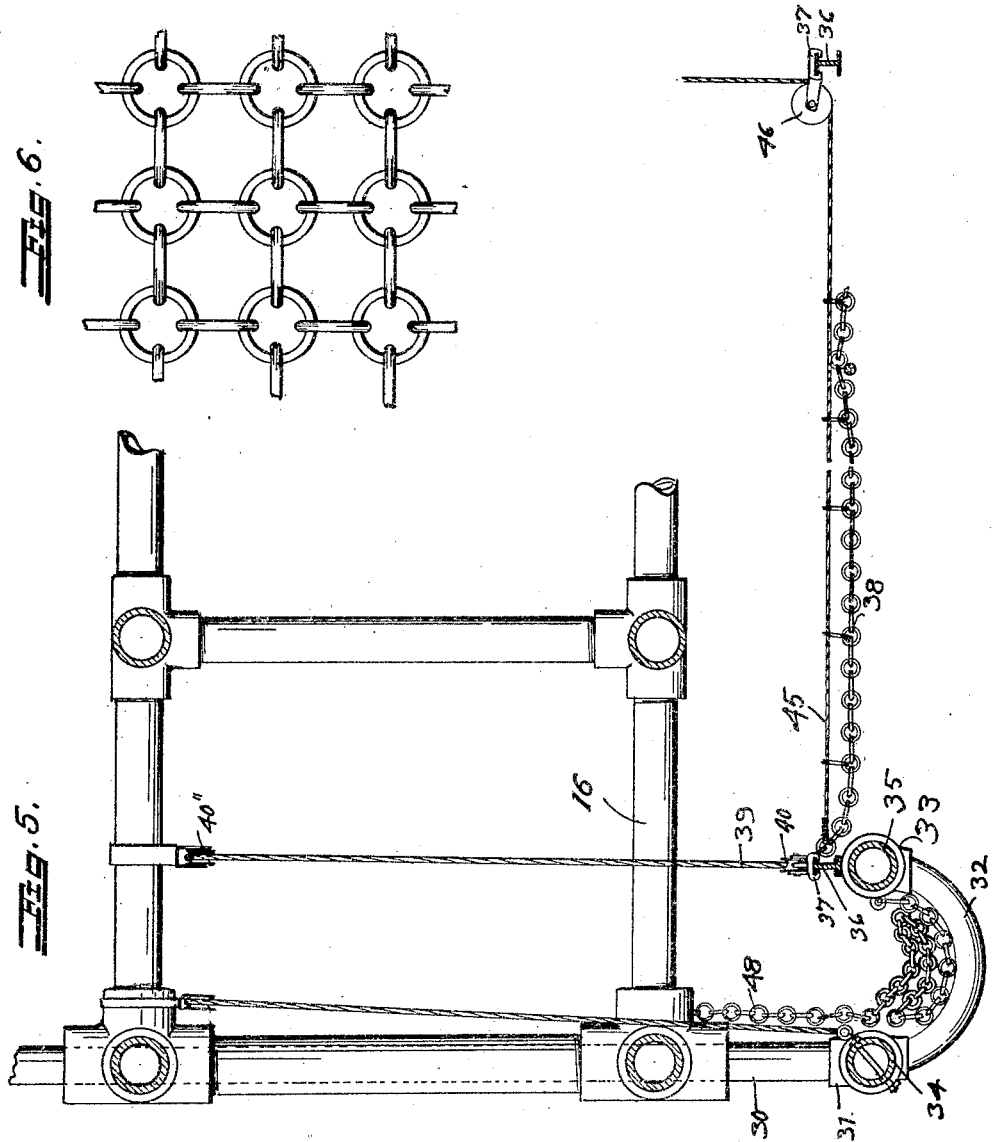

UNITED STATES PATENT OFFICE.

MILLIE SKRMETTI, OF OAKLAND, CALIFORNIA.

FISHING APPARATUS.

1,366,749.   Specification of Letters Patent.   Patented Jan. 25, 1921.

Application filed January 29, 1920. Serial No. 354,837.

*To all whom it may concern:*

Be it known that I, MILLIE SKRMETTI, citizen of Austria, residing at Oakland, in the county of Alameda, State of California, have invented new and useful Fishing Apparatus, of which the following is a specification in such full and clear terms as will enable those skilled in the art to construct and use the same.

This invention relates to a fishing appliance intended for deep water fishing, an object of which is to provide a steel net capable of holding any kind of fish, and which net may be raised to the surface of the water when the fish are to be collected.

Another object of the invention is to provide means whereby the net used may be collected in a series of holders at the side of the vessel when it has been raised out of the water and whereby the fish may be completely entrapped within the net when the net has been raised.

Another object of the invention is to dispense with hand labor in raising, spreading and collecting the nets, the only hand labor required being that of picking up the fish caught.

Other objects of the invention will appear as the description proceeds.

An embodiment of the invention is shown in the accompanying drawings in which the same reference numeral is applied to the same portion throughout, but I am aware that there may be modifications thereof.

Figure 1 is a front elevation of the net and boats as they appear in use,

Fig. 2 is a plan view of the boats and net,

Fig. 3 is a sectional view on the line 3—3, Fig. 2,

Fig. 4 is an enlarged sectional view with a portion of the middle of the net broken away for purposes of illustration, Fig. 5 is an enlarged sectional view of the transversely extending portion of the frame work showing one of the cables for keeping the central portion of the bottom of the net tight, and Fig. 6 is a detail showing the type of net used.

The boats may be of any desired type as illustrated at 1 and 2, and have hatches 3 along the side to receive the fish. Each boat has masts as indicated at 5 and 6, for the purpose of assisting in holding the net supporting frame work in the proper position, suitable cables 10 to 13 inclusive being connected with each of the masts and also connected with the net supporting frame work.

The net supporting frame work consists of a plurality of pipes 14 joined by means of crosses 15 and a plurality of pipe 16 extend longitudinally of each boat along one side connected to each other by double crosses 17. The double crosses 17 are in turn connected to braces 18 and a larger vertical pipe 19.

Below the upper frame work, there is a duplicate frame work consisting of the pipes 20 connected by the crosses 21, which pipes are in turn connected to double crosses 22 alongside the boats to which the lower ends of the pipes 19 are connected.

The crosses 22 have the pipes 23 connected therewith, which pipes extend to the end of the brace 18 and may be suitably secured to the boat. The rectangular grids thus produced may be connected together vertically by means of pipes along the longitudinal line as indicated at 25 and along the transverse line as indicated at 26 to give the entire frame work additional strength; or more vertical members may be used should that be necessary.

Transversely with respect to the bows, the upper double crosses 27 are connected with the lower double crosses 28 by means of vertical pipes 29 the same size as the pipes 19.

Slidable through the series of vertical pipes 19 and 29, are a plurality of vertical pipes 30. These pipes are connected with crosses 31 at their lower ends which crosses are in turn connected with suitable semicircular receiving hooks 32 connected to other crosses 33.

The crosses 31 and 33 are all connected by means of the short lengths of pipe 34, 35.

Extending transversely from one boat to the other at front and back, is an I beam 36, said I beam being secured to the tops of the crosses 33 and one end thereof extending over the top of the hooks 32 adjacent one of the boats.

Mounted on the I beam are a plurality of double hooks 37 to which hooks the net 38 is connected along two edges of the net at front and back.

The net consists of a plurality of steel rings connected together as shown in Fig. 6, of such size as is deemed necessary for the fish it is desired to catch.

Cables 39 on the left hand boat 1, Fig. 1 at bow and stern serve to pull the net along the beam 36 and spread it, said cables passing under pulleys 40 and over suitable pulleys 40', 40" on the boat 1. Cables 41 at bow and stern of the right hand boat 2, Fig. 1, passing around pulleys 42, 43, 44, serve to pull the net 38 back to its resting place upon the tops of the hooks 32 when the net is not to be used.

In order to hold up the side of the net alongside of the left hand boat, Fig. 1, a cable 45 is provided, which cable passes around a pulley 46 and then up to suitable hoisting apparatus aboard the boat so that it may be used to draw up the net as illustrated in Fig. 5 to prevent the escape of fish alongside that edge of the net.

The side nets 48, 49, 50, 51 are connected at their upper edges to the lower horizontally extending members 16 and when the pipes 30 are raised out of the water, the side nets collect in the hooks 32 at front and back and alongside each boat the pipes 29, 30 are each provided with hoisting cables as indicated at 50' to 58 in order to raise the net out of the water.

Suitable tracks 60 may be installed upon the lower pipes 20 to receive small cars 61 for the purpose of collecting the fish when the nets have been raised.

In operation, the boats move from place to place, with the nets raised as illustrated in Fig. 3, the bottom net being piled up alongside the right hand boat. When a school of fish has been sighted, the side nets are lowered; and after the side nets have been lowered, the cables 39 are operated to pull the bottom net out to the position shown in Fig. 1, after which the cable 45 is operated to pull the edge of the net adjacent the left hand boat 1, Fig. 3 up tightly whereby the entire series of pipes 30 and hooks 32 may be raised with the extended nets and the fish may then be taken off the net 38.

What I claim is as follows, but various modifications may be made in the construction shown in the drawings and above particularly described form, within the purview of my invention:

1. A fishing apparatus comprising a pair of boats, a frame work carried thereby, a second frame work slidable in the first frame work, side nets carried thereby, a bottom net, means to spread and means to collect said bottom net alongside one of the boats.

2. A fishing apparatus comprising a pair of boats, a frame work connecting them, a second frame work slidable in the first frame work and having a plurality of receiving hooks, side nets adapted to be collected by said receiving hooks when not in use and the second frame work raised, a horizontal net, a pair of rails along which said horizontal net may be moved to spread it, and cables for collecting it on the hooks at one edge of the slidable frame work, 3. A fishing apparatus comprising a pair of boats, a frame work supported thereby, a second frame work slidable in the first frame and having a plurality of receiving hooks at its lower edge, side nets along the latter frame work adapted to be collected upon the hooks at the lower edge thereof when the frame is raised, rails along two sides of the latter frame work, a horizontally movable net slidably connected to said rails, a pair of cables for extending the net, and a second pair of cables for collecting the net and collecting it upon the hooks at one side of the slidable frame work.

4. A fishing apparatus comprising an extended rigid frame work, car rails supported thereby, a second frame work slidable in the first frame work and having receiving hooks at its lower edges around four sides, side nets connected to the fixed frame work and to the slidable frame work and adapted to be collected by the hooks when the slidable frame work is raised, rails extending alongside the slidable frame work adjacent the hooks, a horizontally movable net permanently fastened along one edge, hooks to slidably secure two edges of said horizontal net and rails, cables for extending and collecting the net, and another cable for tightly drawing up the fourth edge of the net.

In testimony whereof I have hereunto set my hand this 17th day of January A. D. 1920.

MILLIE SKRMETTI.